United States Patent Office 2,751,650
Patented June 26, 1956

2,751,650

HIGH STRENGTH SHELL MOLDS

Charles F. Froberger, Oak Park, Mich., assignor to General Motors Corporation, Detroit, Mich., a corporation of Delaware No Drawing. Application November 19, 1952,
Serial No. 321,509

13 Claims. (Cl. 22—193)

This invention relates to improvements in shell molding and more particularly to an improved shell mold for use in the precision casting of metals.

Recently developed techniques in foundry practice employ thin-walled dispensable molds and cores composed of sand and thermosetting binders. These procedures, generally referred to as "shell molding" processes, are particularly suited for the production of precision castings of a wide variety of metals. Essentially the shell molding process consists of employing a thermosetting plastic or resin as a binder for the sand grains to form rigid molds having high gas permeability, good surface smoothness and dimensional stability. The molding material, generally a dry mixture of a major proportion of silica sand and a minor proportion of a thermosetting binder, is used in a powdered form with no water being added. Phenol-formaldehyde, melamine-formaldehyde and urea-formaldehyde resins are typical examples of the type of thermosetting binders preferably used. It is desirable that the sand employed be free of metal oxides, clay, moisture and organic matter.

These sand-resin molds are prepared by allowing a dry mixture of sand and powdered resin to come in contact with a hot metal pattern for a short period of time. A layer of the mixture adheres to the metal pattern surface due to the heating of the resin which entraps the sand with which it is intimately mixed, thereby accurately reproducing pattern details. The half patterns, gates and runners are usually all permanently fixed on metal plates. Metal patterns must be used because they are subjected to elevated temperatures. Pattern temperatures within the range of about 250° F. to 450° F. are typical, but under certain conditions, temperatures up to about 600° F. may be advantageously employed. The pattern temperature and the length of time the molding material is allowed to remain in contact with the hot pattern surface determines the resulting thickness of the mold. Mold build-up times generally range from a few seconds to approximately two minutes depending upon the particular application.

After this short time interval, the unbonded sand and resin are removed and the closely adhering sand-resin layer is cured, preferably by heating to a temperature within the range of about 300° F. to 1400° F. for a short period of time, usually from a few seconds to about five minutes, while in contact with the heated metal pattern. This curing operation results in the curing of the organic binder which bonds the sand grains together. After the removal of the pattern and the mold from the curing oven, the mold is stripped from the pattern. The completed molds are, in effect, thin shells which possess a sufficient strength and stiffness which make them suitable for many casting operations.

One of the primary reasons for the relatively restricted use of the shell molding process up to the present time has been the comparatively high cost of the organic binder. Inasmuch as the sand-resin mix normally contains up to about 15% by weight of a thermosetting resin binder, the cost of the binder has been a substantial item of expense when this process is employed. This is particularly true in applications which require the inclusion of a finely comminuted refractory material such as silica flour or powdered spent catalyst material in the molding mix since such a mixture necessitates the use of an even higher binder content. The use of a mix containing a fine refractory filler material is especially desirable in satisfactorily casting steel or other high melting metals by the shell molding process, a procedure which previously has been impracticable. Moreover, shell molds heretofore employed have proved to be somewhat brittle and not sufficiently strong or resilient to provide optimum results in all instances.

Accordingly, the principal object of the present invention is to provide an improved shell mold which is appreciably less expensive than those heretofore used. A further object of this invention is to provide a process for forming shell molds in which the amount of the relatively costly thermosetting resin binder may be substantially reduced. A still further object is to provide an organic binder which permits the formation of shell molds having improved mold surfaces.

The above objects are obtained in accordance with my invention by forming relatively inexpensive shell molds of a mixture of sand and/or other suitable refractory material, and an improved binder which comprises a thermosetting resin binder material, a thermoplastic resinous material derived from wood, hereinafter referred to as a lignin type resin, and in some cases a small amount of added accelerator or co-condensating agent such as hexamethylenetetramine or paraformaldehyde. The thermosetting binder provides the mold with smooth casting-defining surfaces and a high strength while the thermoplastic resinous material is employed as a copolymerizable material to provide an improved bonding together of sand particles as well as to improve the strength of the mold.

During the formation of a shell mold according to the present invention, an improved casting-defining mold surface results from the co-condensation or copolymerization of the thermoplastic resinous material and the thermosetting resin to form a substantially completely thermoset product with a relatively small amount of thermosetting resin. The thermosetting resin preferably is partially polymerized when mixed with the thermoplastic resinous material so that a relatively short heat treatment will cure the binder mixture.

It will be understood that the term "mold," as used herein, is applied in its generic sense to mean a casting form which includes both molds and cores, this invention in no manner being limited to the former. Similarly, unless otherwise indicated, the word "pattern" is used herein as including both mold patterns and core boxes.

The improved organic binder of the present invention comprises an intimate mixture of a thermosetting resin and a thermoplastic lignin type resin derived from wood. In practice, I have found that the thermoplastic resinous material should constitute at least approximately 25% by weight of the binder. Greater amounts, in some cases up to about 75% by weight, also may be used. In the formation of shell molds suitable for many casting operations I have found that superior results are obtained if the organic binder contains about 40% to 60% by weight of the thermoplastic resinous material, 50% by weight at present being preferred.

The term "lignin type resin" hereinafter used as descriptive of the thermoplastic material in accordance with the invention is intended to include various wood derivative resinous materials in which the molecules contain both methoxyl and hydroxyl groupings. Such materials may be obtained from a variety of wood products including sawdust, waste liquor from the paper industry, wood chips, etc. by physical and/or chemical treatment. Illustrative of one type of thermoplastic resinous material is a substantially gasoline-insoluble resinous material obtained by extracting a resinous wood with a coal tar hydrocarbon, removing said hydrocarbon by evaporation, leaving a residue comprising a mixture of wood rosin and thermoplastic resinous material, extracting the rosin with a petroleum hydrocarbon, leaving a thermoplastic resinous material, hereinafter referred to as a gasoline-insoluble wood resin. Such a material is available commercially as "Vinsol" resin (a product of the Hercules Powder Company).

Another type of thermoplastic resinous material is one derived from waste soda pulp liquor of the paper industry by precipitating spent black liquor with carbon dioxide, filtering the precipitate, washing it with dilute sulfuric acid to neutralize any remaining black liquor and drying the resulting paste to provide a thermoplastic resinous material hereinafter referred to as an alkali lignin resin. Illustrative of such a product is the commercially available alkali lignin by-product known as "Meadol," a product of the Mead Corporation.

It will be understood that mixtures of thermoplastic materials may be used to make up the desired thermoplastic content of the binder if desired. I have found, for example, that in some cases very beneficial results are obtained by employing a mixture of the above types of alkali lignin resin and gasoline-insoluble wood resin. In many cases a mixture containing about one to five parts of an alkali lignin resin to one part of the gasoline-insoluble pine wood resin is preferred.

In general, any thermosetting resinous material capable of copolymerization with a thermoplastic lignin type resin under the conditions encountered in shell molding may be used in forming a binder embodying the present invention. Typical of such resins are phenol formaldehyde, urea formaldehyde and melamine formaldehyde resins.

In some cases there may be enough curing agent already incorporated in the thermosetting resin as received to insure a proper cure of the binder mixture. In such a case no further curing agent need be added. In most cases, however, it is necessary to add a curing agent. In general, a curing agent such as hexamethylenetetramine or paraformaldehyde should be present in a small but effective amount not in excess of about 8% by weight of the thermosetting resin in the binder mixture. If an excess of curing agent is employed, thermal stresses are set up and cracking of the mold occurs on pouring of the molten metal.

In practice, the amount of the organic binding mixture of the present invention to be employed in a particular shell molding operation may be varied, although in general, it is desirable to employ a relatively small amount of binder to reduce the cost of the molds. Employing organic binders of the present invention I have found that in many cases as little as 2% by weight of binder may be used. The maximum amount of binder to be employed generally is determined by cost considerations, although in most cases superior results are obtained if no more than about 15% by weight of the binder is employed.

Any ordinary sand or other refractory material may be employed in forming molds of the present invention. In most cases it is desirable to employ a refractory material having an American Foundryman's Society fineness number within the range of about 25 to 180. At present I prefer to employ a refractory material having an AFS fineness number within the range of 50 to 125.

In many cases it is desirable to also employ materials such as silica flour or powdered spent catalyst, etc., as fines to provide a better mold facing surface. In practice, amounts within the range of about 3% to 20% by weight are employed in many cases to provide a more heat resistant mold surface. In some instances it is desirable to employ a small amount of a liquid thermosetting resin to reduce dusting of the finely divided refractory material, and to prevent segregation of the mixture. For example, the addition to the mixture of a liquid phenol formaldehyde resin in an amount equal to approximately 0.5% of the weight of the refractory filler portion has proved to be satisfactory.

In practice, very beneficial results have been obtained in the casting of steel by a shell molding process when the mixture forming the shell mold is composed essentially of about 75% to 95% by weight of dry sand, about 3% to 20% by weight of silica flour or other finely divided refractory material and about 5% to 15% of an organic binder.

The following is a specific illustrative example, expressed in per cent by weight, of a mold mixture especially suitable for shell molds employed in the casting of steel:

| | Percent |
|---|---|
| Berkeley float sand (AFS 123) | 79.86 |
| Silica flour | 8.9 |
| Lignin type resin | 6.0 |
| Phenol formaldehyde resin | 4.0 |
| Hexamethylenetetramine | 0.54 |

In the casting of cast iron by the shell molding process, excellent results have been obtained by employing a mold mix consisting essentially of about 90% to 97% by weight of dry sand or other refractory material and about 3% to 10% by weight of organic binder.

The following is a specific illustrative example, expressed in per cent by weight, of a shell mold mix especially suitable for the casting of cast iron:

| | Percent |
|---|---|
| Juniata sand (AFS 100) | 92.76 |
| Lignin type resin | 3.0 |
| Phenol formaldehyde | 4.0 |
| Hexamethylenetetramine | 0.24 |

Another specific example of a shell mold mixture in accordance with the present invention is the following:

| | Percent |
|---|---|
| Phenol formaldehyde resin | 1.0 |
| Alkali lignin resin (Meadol) | 0.7 |
| Gasoline-insoluble resin (Vinsol) | 0.3 |
| Hexamethylenetetramine | 0.05 |
| Balance Lake Sand (AFS 50) | |

Mixtures formed in accordance with the preceding examples produce excellent results when placed in contact with a metal pattern which has been heated to a temperature between approximately 380° F. and 450° F. and permitted to remain on this pattern for approximately 45 seconds.

In the formation of a shell mold having improved casting-defining surfaces I prefer to first thoroughly dry mix a thermosetting resin and a thermoplastic lignin type resin, in most cases adding a small amount of hexamethylenetetramine or paraformaldehyde as a curing agent. This mixture is then intimately mixed with sand or other refractory material which is to form the body of the mold.

The resulting mixture is then placed in contact with a heated mold surface having a temperature of at least approximately 350° F. At temperatures below about 350° F. the thermoplastic resinous material will not melt or flow to a sufficient extent to be of any value in strengthening the mold. On the other hand, if the pattern temperature is above about 450° F. the resultant shell mold will become homogenous with respect to the binder constituents.

To obtain the proper resin flow within the above temperature range, the mold mixture should remain in contact with the heated pattern surface for at least 10 seconds with a contact time of between 20 and 35 seconds at the above pattern temperature usually providing highly satisfactory results. In general, there is no maximum pattern contacting time because the mold build-up on the pattern is sufficiently rapid so that heat is quickly conducted from the pattern and soon results in the lowering of the pattern temperature below 350° F. if no further heat is applied to this mold, thus precluding further flowing of the thermoplastic material. In practice, however, approximately two minutes should be considered as the maximum period the mold should be allowed to contact the hot pattern before removal of the mold-pattern assembly for curing.

The resulting mold must be subsequently baked to complete the cure of the shell mold. The time of curing or baking in most cases should be between about 30 and 120 seconds. Of course, the length of the curing period depends on the baking temperature. Curing temperatures between 350° F. and 1400° F. have proven to be satisfactory although in some cases oven temperatures as high as 1800° F. may be employed. Dumping the molded mix upon the hot metallic pattern together with the subsequent baking cures the binder by causing a copolymerization of the lignin type resin and the thermosetting resin, with the aid of the included small proportion of hexamethylenetetramine, paraformaldehyde or similar curing agent.

A shell mold formed in accordance with the present invention while utilizing a relatively small amount of expensive thermosetting resin, thus appreciably reducing the cost, permits the casting of metals, nonferrous as well as ferrous, to closer tolerances since the casting-defining surfaces of the mold, while readily permeable to gases, have a high strength and smoothness.

Various changes and modifications of the embodiments of the invention described herein may be made by those skilled in the art without departing from the spirit and principles of the invention.

I claim:

1. A sand-resin mold for use in shell molding, said mold being formed from a mixture comprising approximately 2% to 15% by weight of a heat-hardenable binder which comprises a mixture of thermosetting resin and a thermoplastic lignin type resinous material derived from wood and containing both methoxyl and hydroxyl groups and the balance all sand, said thermoplastic materials constituting about 25% to 75% by weight of the binder.

2. A sand-resin molding mix for application to a heated pattern to form shell molds, said molding mix consisting essentially of 80% to 98% by weight of sand, a small but effective amount not in excess of about 15% by weight of a thermoplastic lignin type resinous material derived from wood and containing both methoxyl and hydroxyl groups, and a small but effective amount not in excess of 8% by weight of a thermosetting resin.

3. A sand-resin shell mold formed from a mixture comprising about 75% to 95% by weight of sand, about 2% to 20% by weight of a different refractory material, and about 5% to 15% by weight of a binder which consists essentially of a thermoplastic lignin type resinous material derived from wood and containing both methoxyl and hydroxyl groups, a small amount of a curing agent and a thermosetting resin.

4. A sand-resin shell mold formed from a mixture comprising about 90 to 97% by weight of sand and 3% to 10% by weight of a binder comprising a thermoplastic lignin type resinous material derived from wood and containing both methoxyl and hydroxyl groups and a thermosetting resin.

5. A molding material for shell molding consisting of a mixture of a refractory filler and an organic binder, said binder consisting essentially of an intimate mixture of a thermoplastic lignin type resinous material derived from wood and containing both methoxyl and hydroxyl groups, a gasoline-insoluble wood resin and a thermosetting resin.

6. A molding material for shell molding comprising approximately 80% to 98% by weight of a refractory material and approximately 2% to 15% by weight of an organic binder, said binder consisting essentially of an intimate mixture of a thermoplastic lignin type resinous material derived from wood and containing both methoxyl and hydroxyl groups, and a thermosetting resin, said thermoplastic material constituting approximately 25% to 75% by weight of the total binder content.

7. A molding material for shell molding comprising approximately 80% to 98% by weight of a refractory material and approximately 2% to 15% by weight of an organic binder, said binder consisting essentially of an intimate mixture of a thermoplastic lignin type resinous material derived from wood and containing both methoxyl and hydroxyl groups, and a thermosetting resin, said thermoplastic material consisting essentially of one to five parts of an alkaline lignin resin and one part of a gasoline-insoluble wood resin, the thermoplastic material constituting approximately 25% to 75% by weight of the total binder content.

8. A method of forming a smooth-surfaced shell mold which includes the steps of placing a mixture of a refractory filler material, a thermoplastic lignin type resinous material derived from wood and containing both methoxyl and hydroxyl groups, and a thermosetting binder into contact with a heated pattern so that a thin smooth-surfaced layer of the mixture is formed adjacent said pattern, thereafter curing the mold and removing it from the pattern surface.

9. A method of forming a smooth-surfaced shell mold which comprises placing a refractory material containing from about 2% to 15% by weight of an organic binder, which consists essentially of a thermosetting resin and a thermoplastic lignin type resinous material derived from wood and containing both methoxyl and hydroxyl groups, into contact with a hot metallic pattern for a short time interval to cause a copolymerization of the binder materials, removing any excess material, and thereafter baking the formed shell mold.

10. The process of forming a shell-type sand-resin mold which comprises mixing approximately 3% to 20% by weight of a refractory flour, 2% to 15% by weight of a binder which consists essentially of a mixture of a thermosetting resin, a thermoplastic lignin type resinous material derived from wood and containing both methoxyl and hydroxyl groups, and a binder curing agent, and the balance substantially all sand, placing said mixture in contact with a hot metal pattern for a time sufficient to soften the mixture and cause a copolymerization of the binder material, subsequently removing any excess molding mixture, and thereafter heat treating the formed mold.

11. A sand-resin molding mixture for application to a heated pattern to form shell molds, said molding mixture comprising, by weight, approximately 80% to 98% sand, and a small but effective amount not in excess of about 15% of a thermosetting resin and at least one thermoplastic lignin type resinous material derived from wood and containing both methoxyl and hydroxyl groups selected from the class consisting of an alkali lignin resin and a gasoline-insoluble wood resin.

12. A shell molding material compirsing approximately 80% to 98% by weight of a refractory material and about 2% to 15% by weight of an organic binder, said binder consisting essentially of an intimate mixture of a thermosetting resin and a thermoplastic resinous material, said thermoplastic resinous material being obtained by extracting a resinous wood with a solvent, evaporating the solvent to leave a residue of wood rosin and thermoplastic material, and thereafter extracting the rosin with a petroleum hydrocarbon.

13. A shell molding material comprising approximately

80% to 98% by weight of a refractory material and about 2% to 15% by weight of an organic binder, said binder consisting essentially of an intimate mixture of a thermosetting resin and a thermoplastic resinous material, said thermoplastic resinous material being obtained from wood by precipitating spent soda pulp liquor with carbon dioxide, filtering the precipitate, neutralizing any remaining liquor and drying the resulting paste to form an alkali lignin resin.

References Cited in the file of this patent

UNITED STATES PATENTS

| | | |
|---|---|---|
| 1,777,998 | Dent | Oct. 7, 1930 |
| 2,101,330 | DeLaney | Dec. 7, 1937 |
| 2,405,650 | Hartwig | Aug. 13, 1946 |
| 2,433,168 | Staeger | Dec. 23, 1947 |

FOREIGN PATENTS

| | | |
|---|---|---|
| 708,041 | Germany | July 10, 1941 |

OTHER REFERENCES

Steel, December 3, 1951, vol. 129, issue No. 23, pages 90 and 92.

The Foundry, October 1950, vol. 78, No. 10, pages 162, 164 and 168.